United States Patent [19]
Pecot et al.

[11] Patent Number: 5,558,465
[45] Date of Patent: Sep. 24, 1996

[54] METHOD AND DEVICE FOR LAYING AN UNDERGROUND TELECOMMUNICATIONS CABLE

[75] Inventors: Alain Pecot, Lannion; Philippe Lesueur, Tregastel, both of France

[73] Assignee: France Telecom, Paris, France

[21] Appl. No.: 457,218

[22] Filed: Jun. 1, 1995

[30] Foreign Application Priority Data

Jun. 6, 1994 [FR] France ................................... 94 06904

[51] Int. Cl.⁶ ...................................................... E02F 5/10
[52] U.S. Cl. ........................................ 405/178; 254/134.4
[58] Field of Search ..................................... 405/154, 156, 405/157, 178, 180, 181, 182, 183, 184; 254/134.4

[56] References Cited

U.S. PATENT DOCUMENTS

| | | |
|---|---|---|
| 3,390,533 | 7/1968 | Gremillion . |
| 4,529,148 | 7/1985 | Hesprich et al. . |
| 4,629,363 | 12/1986 | Rose et al. ........................ 405/178 X |
| 4,896,997 | 1/1990 | Gaylin . |
| 4,981,396 | 1/1991 | Albertson et al. ..................... 405/178 |
| 5,263,686 | 11/1993 | Sano et al. ........................... 254/134.4 |

FOREIGN PATENT DOCUMENTS 3616627  11/1987  Germany .

Primary Examiner—William P. Neuder
Attorney, Agent, or Firm—Pollock, Vande Sande & Priddy

[57] ABSTRACT

To lay an underground cable, a first drum is stationarily positioned and supplies the cable to a trench that is dug in the ground. A hauling pig is connected to the leading end of the cable. A second drum, mounted to a movable tractor, supplies a tube to the trench and is intended to receive the cable. The tractor also has a plowshare mounted to its forward end for forming the trench as the tractor moves. A compressor is connected to a tube section, rearwardly of the pig, for propelling the leading end of the cable to a predetermined point in a turn of a rolled tube as stored on the second drum. In the event an obstacle is encountered by the tractor, the compressor is interrupted and a length of tube, at least as long as one turn on the second roll, is payed out from the second drum and temporarily remains unoccupied by cable. The payed out length of tube is cut at an end so that the tractor becomes free to move around the obstacle. The payed out length is repositioned to negotiate the obstacle and the cut end is then spliced to the corresponding end of the tube on the second drum. Restoration of compressor operation continues to propel the leading end of the cable to the predetermined point in the turn of the rolled tube on the second drum.

9 Claims, 1 Drawing Sheet

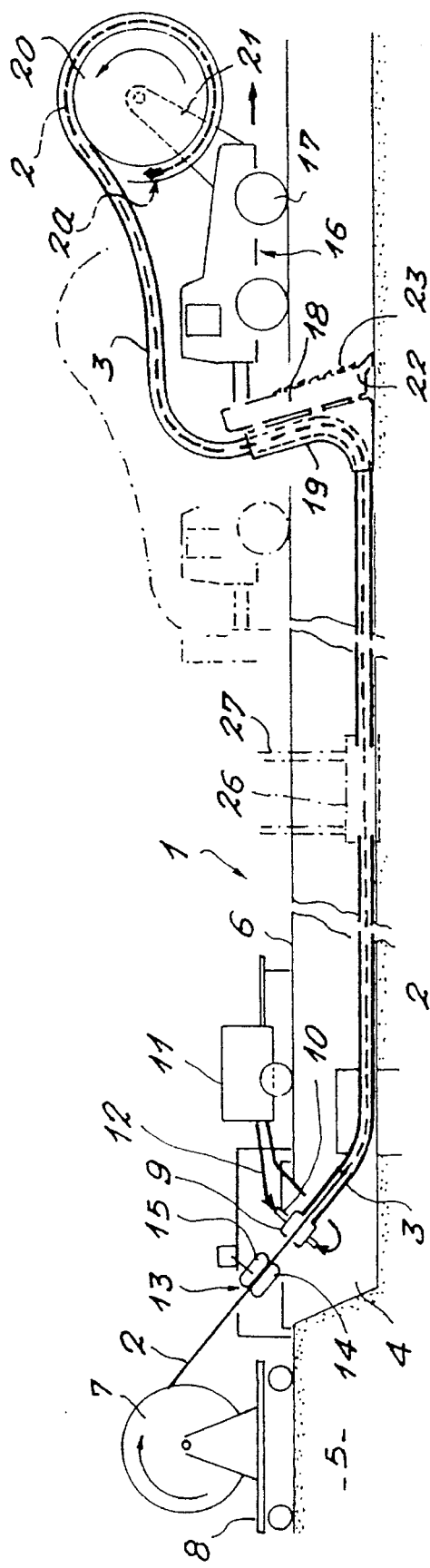
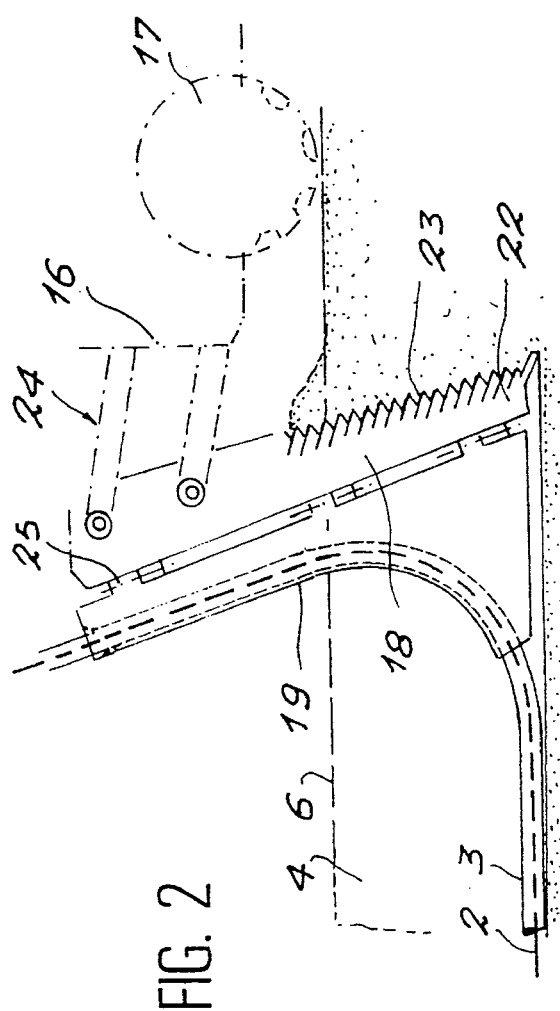
FIG. 1
FIG. 2

1

METHOD AND DEVICE FOR LAYING AN UNDERGROUND TELECOMMUNICATIONS CABLE

FIELD OF THE INVENTION

The present invention relates to a method for laying a transport or distribution cable, especially for telecommunications, in an underground trench, this cable being located inside a protective tube made of plastic or the like. The invention also relates to a device for implementing this method.

BACKGROUND OF THE INVENTION

Among the methods for laying a telecommunications cable, one of them, the one most generally used, consists firstly in laying the tube inside the previously-dug trench before covering this trench over, the cable then being hauled or pushed inside this tube, either by pulling using an attachment fixed to the end of the cable and the opposite end of which is wound onto a winch or the like beyond the tube, or by blowing compressed air exerting a thrust on a pig secured to the cable and the outside diameter of which is substantially equal to that of the tube in order to obtain relative sealing. An alternative may consist in using a magnetic head for hauling the end of the cable through the tube as a machine which lays the tube in the trench travels along.

However, with these hauling and blowing solutions, the lengths of cable which can be put inside the tube are relatively limited, which, especially in the case where a hauling rope is being used, requires the provision, from point to point, of intermediate chambers making it possible to haul the cable through the tube section by section between two successive chambers and also to boost the hauling force using an intermediate tracked driver, from one section to the next. Furthermore, when the path is curved, the laying of the cable is rendered yet more difficult owing above all to the increase in the hauling or thrusting forces required.

Methods are moreover known in which the cable is laid directly in the ground by means of a machine which simultaneously opens up the ground in order to form a narrow trench into which the cable is unwound from a drum as the machine travels along, the trench then being filled in again behind the machine. In this case, the cable must itself include means which protect it from the environment and must moreover be mechanically reinforced in order to withstand the strains inherent to this laying method, which substantially increases its cost price. Furthermore, once the cable has been placed in its trench and the trench has been filled in again, it is not possible to change the cable itself, except by reopening the trench, which may pose tricky problems, particularly in towns or in a difficult environment.

A third solution, which to some extent combines the previous ones, consists in introducing the cable into its outer protective tube at the factory, for example by extruding the tube continuously around the cable, and in delivering the assembly, wound onto a drum or the like, to the site where it is to be laid in the trench.

This technique makes it possible to retain the advantages of the methods quoted at the beginning, by protecting the cable in the ground and above all allowing the tube which is permanently buried to be reused, it being possible for the cable housed therein optionally to be withdrawn and replaced by another. This same technique makes it possible to avoid the drawbacks of the second methods, the cable not necessarily needing to be reinforced from a mechanical point of view by an outer jacket, generally made of steel, which then requires the conductors of this cable to be protected against the induced currents, which requires earthing, which is a nuisance.

In particular, this solution makes it possible to envisage more favourable economic conditions, avoiding the operations necessary for putting the cable inside the tube on the laying site itself.

However, this last method still exhibits drawbacks, essentially connected with the topography of the environment in which the cable is to be laid, particularly owing to obstacles which may be encountered on the path of the trench accommodating the tube containing the cable, such as crossing carriageways, water courses, railway tracks, etc.. These obstacles in particular require a tunnel or continuous passage to be made in the ground beforehand for the introduction of the tube, preventing the production of open trenches which may, moreover, be prevented for technical reasons or under certain regulations.

Now, the probability of encountering such obstacles is in no way negligible, especially with the current solutions in which the lengths of tube containing the cable to be laid in a single piece now range from 300 m approximately for cables with metal conductors to 2400 m as a general rule for fibre-optic cables.

Owing to the presence of the cable in the tube, the latter cannot be cut at the location of the isolated point encountered. Indeed, on the contrary, in line with this point it is necessary to pay out the tube with the cable inside it in order to gain access to the end on the barrel of the drum, depositing it on the ground especially in a figure eight, in order to avoid phenomena of torsion, before negotiating the obstacle.

The tube with the cable inside thus paid out may be laid through the obstacle by driving or some other method, making continuous passage through which the total length of cable has to be passed. The tube with its cable is then repackaged on the drum in order to resume the operation which consists in burying it at the bottom of the trench. The object of this operation is to avoid splicing the cable, necessary in the case of the tube being cut; in actual fact, the cable cannot be pulled out of the tube owing to the friction of one on the other on the drum or on the ground when the tube is arranged on the latter in figure eight. Additional splicing is moreover always detrimental to the technical and economical balance of the installation for laying such a cable.

It is therefore understood that these operations require significant manpower, numerous interventions on the cable and on the tube and sufficient space for laying out on the ground. This results in risks to the cable itself, especially when it consists of optical fibres, and in all cases involves a significant cost and above all a detrimental cutting of the cable. Moreover, in practice, this solution can be envisaged only in limited cases, for lengths of tube having to negotiate just one obstacle and when the latter is only a few hundreds of metres from one of the ends of the length to be laid.

BRIEF DESCRIPTION OF THE INVENTION

The subject of the present invention is a method and a device for laying a long underground cable housed in an outer protective tube, the cable and the tube being laid together in an accommodating trench, which avoids these drawbacks, the proposed method in particular making it possible to negotiate the obstacles or single points encountered in the path of the cable under optimum conditions of effectiveness and for a very greatly reduced cost price of the operation, without paying out and then re-reeling up the cable itself, just the plastic outer tube.

Synthetically, the method according to the invention consists in combining two techniques, one laying the tube containing the cable over a given length using a laying machine which as it travels along forms a trench and deposits the tube at the bottom thereof, the other continuously introducing the cable into the tube by blowing using a pig borne by the cable, concomitantly with the travel of the machine.

To this end, and according to the invention, the method in question, in which use is made of a first and of a second rotary drum, the first of which, in a fixed position on the ground at the initial end of a trench for accommodating this cable, supports the latter allowing it to unwind continuously as the cable is laid in the trench. The second rotary drum allows the simultaneous unwinding of a tube for the external protection of the cable, this second drum being borne by a mobile machine capable, as it travels along the ground, of forming the trench and of laying the tube surrounding the cable inside this trench, is characterized in that it consists in equipping the cable with a hauling pig fixed to the end of this cable and designed to carry it along inside the tube under the effect of a compressed-air pressure created behind this pig by the initial end of the trench where the cable penetrates the tube. The pig carries the cable along being halted by friction on at most the second turn of the tube wound onto the second drum, and in permanently maintaining the pressure behind the pig inside the tube so that it always retains the same relative position in the turn of the tube wound onto the second drum, independently of the travel of the machine and of the depositing of the tube containing the cable at the bottom of the trench.

The device for implementing this method is characterized for its part in that it includes two drums, the first of which supports the cable and is located at a fixed position at the initial end of the trench, and the second of which is borne by a mobile machine comprising a ploughshare for making the trench as it travels along, this second drum supporting the tube for protecting the cable housed inside this tube, a pig for hauling the cable fixed at the end thereof, an air compressor for creating a continuous thrusting force inside the tube behind the pig and means for sealing the tube at its end, connected to the compressor, via which the cable enters.

Advantageously, and in a way known per se in the technique of blowing a pig for hauling a cable inside an outer protective tube or pipe, the device may include, along the length of the tube in the trench, stations for boosting the compressed-air pressure, in order to maintain a substantially constant thrust force on the pig as it travels along inside the tube progressively deposited in the trench.

For preference too, the sealing means located at that end of the tube via which the cable enters may be associated, upstream relative to the direction of travel of the cable carried along by the pig, with a mechanical thrusting track which creates on the outer surface of the cable a force complementing its entry into the tube.

The invention thus consists in simultaneously laying the cable and the tube which surrounds it, regardless of the length of the trench, owing to the travel of the pig hauling the cable inside this tube as far as a position which always remains the same, situated substantially in the region of the first or at most the second turn of the tube wound onto the second drum.

As it is paid out to allow the tube to be deposited with the advancement of the machine forming the trench, the pig which hauls the cable advances still further inside the tube, keeping a substantially constant position.

The blowing of the cable by the pig under the effect of the pressure of compressed air introduced via the end of the tube at the beginning of the trench, or even from place to place depending on the length of this trench, at every moment causes the end of the cable to be tensioned, which cable is thus hauled through the tube until, owing to friction of the pig and of the cable inside the tube, and also to the winch effect resulting from the winding of the tube onto its drum, this pig is halted in position in the tube. In contrast, owing to the fact that the pressure is permanently maintained on the pig, the latter continues its relative advancement in the tube, carrying the cable along, each time advancing by a length which corresponds exactly to the length unwound when this tube is laid in the trench.

Thus, by way of indication, with a pig fixed to the end of a cable 13 mm in diameter, pushed by a pressure of 14 bar into a tube of inside diameter of 40 mm, it is observed that the pig becomes blocked in the first turn of the tube, when the second drum bearing this tube itself has a diameter of 3.10 m.

The method according to the invention consequently makes it possible to pass a single point in the following way.

When the machine for simultaneouly making a trench and laying the tube containing the cable at the bottom of this trench finds itself confronted with an obstacle preventing it from continuing its travel, the operating mode consists at that moment in interrupting the blowing, then in unwinding from the second drum a length of tube corresponding to that of the first turn thereof on this drum onto the surface of the ground.

In the next step, the tube is cut beyond the end of the cable and the pig then the empty tube is made to negotiate the obstacle using driving or some other conventional technique, over the length corresponding to the unwinding of the turn, or even over a slightly greater length.

The laying machine and the second drum borne by the latter with the empty tube is then brought up to the other side of the obstacle to be negotiated, after which the cable is passed through the section of tube which has been previously driven through the obstacle until it comes out of the opposite end.

In the final step, the driven section of tube is coupled to the free end of this same tube on the drum borne by the laying machine, and a compressed-air pressure is again created in this tube, behind the pig, which pressure carries the cable along in the section, paying it out from the first drum then, beyond that, makes it travel into the first turn of the tube on the second drum, the various elements then being back in the position which they occupied before the obstacle was encountered.

The operation of making the machine travel along forming the trench and laying the tube containing the cable therein is then resumed, the pig permanently travelling along in the first turn of the tube, as described earlier.

When the tube is associated along its length in the pipe with stations for boosting the compressed air, practically limitless laying lengths can thus be obtained, particularly without it being necessary to effect any splicing on the cable itself, just the tube being cut then coupled together by coupling sleeves or other similar means, beyond each obstacle negotiated in the aforementioned fashion.

These boosting stations are located at places defined each time as a function of the limits of hauling of the cable by the pig, which in known fashion may include an emitter member, the position of which is identified by an appropriate detection means providing on the machine bearing the second drum, so as to allow any possible detachment of the pig to be signalled.

Each station may advantageously be connected to a separate compressor or alternatively all the stations may be connected to a single compressor, provided that the latter is sized with a view to this use.

The machine for laying the tube containing the cable is likewise conventional for this type of operation. It may in particular include a ploughshare comprising a blade opening up the ground in the manner of a plough, this ploughshare being associated with a contiguous chute provided behind the blade for guiding the tube containing the cable as the machine travels along the ground. Advantageously, the blade of the ploughshare may be associated with a vibrating mechanism to ease its penetration into the ground to the desired depth. For preference too, the blade may include teeth making it possible to ease its passage into the ground in the direction of the trench.

The guide chute has a radius of curvature such that it can easily be accommodated by the tube containing the cable, without any risk of damaging the latter, especially when it consists of optical fibres. The laying machine may moreover include, behind the ploughshare and the chute, a compacting mechanism for filling in the trench again and tamping down the ground.

Other features of the method and of the device for laying an underground cable according to the invention will become still clearer through the description which follows of one embodiment given by way of non-limiting example with reference to the appended drawing in which:

BRIEF DESCRIPTION OF THE FIGURES

FIG. 1 is a diagrammatic view in longitudinal section of the installation in question.

FIG. 2 is a sectional view on a larger scale, illustrating one detail of the machine for laying the tube for protecting the cable in the trench for receiving this tube.

DETAILED DESCRIPTION

In FIG. 1, the reference 1 denotes overall the device proposed for laying a cable 2, especially of the telecommunications cable sort, inside a protective tube 3 made of plastic, the assembly consisting of this cable and this tube having to be located in the bottom of a trench 4 made in the ground 5, before this trench is covered back over by an appropriate depth 6 of soil, thus filling it in over the tube.

The cable 2 is unwound as it is laid with the tube 3 in the trench 4 from a first drum 7 borne by a trolley 8, allowing this cable to be brought up close to the initial end of the trench.

Close to this end, the tube 3 includes a casing 9 coupled at the end of the tube and allowing the cable to be introduced inside the tube continuously, maintaining relative sealing relative to the outside, such a casing, itself known in the technique of blowing a cable in a tubular pipe, not being described in detail here. This casing is coupled by a connection piece 10 to a compressed-air compressor 11 making it possible to inject into the tube 3, through the casing, an appropriate air flow rate delivered by the compressor through a line 12.

In a way also well known in the art, the cable 2 is secured at its end introduced into the tube 3 through the casing 9, to a hauling pig 2a, the transverse dimension of which is substantially equal to the inside diameter of the tube so that the pressure of the compressed air delivered by the compressor 11 provides a thrusting force against the pig allowing it to travel along inside the tube carrying the cable along with it over a distance which depends on the pressure of the air, the diameter of the tube, and the weight of the cable itself.

Advantageously, the pneumatic device for blowing the cable 2 along inside the tube 3 may be supplemented by providing, at the entry to the tube at the beginning of the trench, before the sealed introduction casing 9, a thrusting mechanism 13 making it possible to exert a complementary force on the cable easing its travel through the tube, this mechanism including two tracks 14 and 15 pressing against the cable and turning in opposite directions to one another so as to create a hauling effect in the direction in which the cable is entering the tube.

The trench 4 is made in the ground 5 by means of a machine 16 equipped with wheels 17 to allow it to travel along in the direction of this trench, the machine including, coupled behind it in the direction of its travel, a ploughshare 18 allowing a narrow and continuous furrow to be formed behind the machine, as the latter advances.

The ploughshare 18 supports behind it a chute 19 for guiding the tube 3, which tube unwinds from a second drum 20 (as opposed to the first drum 7 paying out the cable 2), this second drum 20 being supported by an arm 21 secured to the machine 16 and consequently travelling along with it as it produces the trench 4. The chute 19 has an appropriate curvature so as to accommodate the tube 3 containing the cable 2 without creating strains in the latter, particularly when it consists of optical fibres.

As can be seen moreover in more detail in FIG. 2, the ploughshare 18 forming the trench advantageously includes a blade 22, possibly associated with a mechanism (not represented) making it possible for it to be subjected to vibration, this blade optimally being equipped with a series of teeth 23 capable of facilitating the penetration and progression of the blade with the machine.

This blade 22 is preferably secured to the machine by means of a deformable parallelogram device 24 allowing it to be raised, the chute 19 itself being articulated at the rear of the blade about hinges 25, to allow it to follow the possible variations in line of the trench without exerting any load on the tube 3.

The operation of the device thus formed has already been explained and will be resumed here only briefly.

The tube 3, wound onto the second drum 20, is progressively laid in the trench 4 as the latter is produced by the ploughshare 18 of the machine 16, before another assembly (not represented) fills in this trench by replacing the corresponding depth of soil 6.

The tube 3 in its part thus laid at the bottom of the trench 4 contains the cable 2 which has previously been blown into the tube by the compressed air from the compressor 11, making the pig 2a connected to the end of the cable travel along inside the tube until it is halted in the latter on the first, or at most on the second turn of the tube on the second drum 20. Advantageously, the pig 2a may include, in known fashion, an emitter member (not represented), the position of which is identified by an appropriate detection means provided on the laying machine 16 bearing this second drum, so as to allow any possible detachment of the pig to be signalled.

As the machine 16 travels along, the tube 3 containing the cable 2 is introduced into the latter, keeping substantially the same relative position on the turn of the tube, which turn is thus permanently filled by the cable as it is laid in the trench.

Advantageously, stations 26 for boosting the compressed-air pressure in the tube may be provided from place to place along the length of the trench, these stations being fed by pipes 27 connected to the compressor 11 at the entrance of the pipe if this compressor is sufficiently dimensioned, or to other, similar, compressors located close to these stations.

The cable and the tube surrounding it are thus laid regardless of the length of the pipe, it being possible for an obstacle to be passed through in the manner already indicated, merely by cutting the tube and not the cable, which is put back in place and pushed through the tube again after this obstacle has been passed through.

Of course, it goes without saying that the invention is not limited to the embodiment more specially described and represented; on the contrary, it encompasses all variants thereof.

We claim:

1. A system for laying underground cable comprising:
   a first drum fixed in position and supplying the cable to a trench dug in the ground;
   a hauling pig formed at a leading end of the cable;
   a second drum mounted to a moveable tractor for supplying a cable protecting tube into the trench as the tractor moves;
   a plowshare mounted to the tractor for forming the trench as the tractor moves; and
   a compressor communicating with a tube section, rearwardly of the pig, for propelling the cable further into the tube.

2. A system for laying underground cable as recited in claim 1 further comprising a plurality of compressor stations along the length of an installed tube, for boosting the compressed air in the tube thereby maintaining a substantially constant thrust force on the pig as the cable becomes further inserted in the tube.

3. A system for laying underground cable as recited in claim 1 further comprising means located at an entry end of the tube for sealing the entry end and preserving pressure generated by the compressor.

4. A system for laying underground cable as recited in claim 1 further comprising means contacting the cable, upstream of the tube, for urging the cable into the tube.

5. A system for laying underground cable as recited in claim 1 wherein the plowshare further comprises a reciprocating blade for excavating a trench; and a chute located behind the blade for guiding a tube portion being payed out into the trench.

6. A system for laying underground cable as recited in claim 1 further comprising a signal emitting device mounted to the pig; and a detector mounted on the tractor for detecting the presence of the pig in the cable.

7. A system for laying underground cable as recited in claim 1 further comprising:
   means located at an entry end of the tube for sealing the entry end and preserving pressure generated by the compressor;
   means contacting the cable, upstream of the tube, for urging the cable into the tube; and
   wherein the plowshare further comprises a reciprocating blade for excavating a trench and a chute located behind the blade for guiding a tube portion being payed out into the trench.

8. A method for laying underground cable comprising the steps:
   fixedly positioning a first drum that supplies the cable to a trench dug in the ground;
   connecting a hauling pig to a leading end of the cable;
   supplying a cable protecting tube from a second drum, mounted to a moveable tractor, into the trench as the tractor moves;
   mounting a plowshare to the tractor and forming the trench as the tractor moves;
   connecting at least one source of compressed air with a tube section, rearwardly of the pig, for propelling the leading end of the cable to a predetermined point in a turn of a rolled tube on the second drum.

9. A method for laying underground cable as set forth in claim 8 further comprising the following steps upon the encountering of an obstacle by the tractor:
   interrupting the source of compressed air;
   paying out a length, at least as long as one turn of tube, from the second drum and unoccupied by a corresponding length of cable;
   cutting the tube at a trailing end of the payed out length of tube;
   moving the tractor around the obstacle;
   repositioning the payed out length of tube to negotiate the obstacle;
   splicing the cut end of the payed out tube length to the tube on the second drum; and
   restoring the source of compressed air for continuing to propel the leading end of the cable to the predetermined point in a turn of the rolled tube on the second drum.

* * * * *